United States Patent [19]

Lacaux

[11] Patent Number: 4,917,664
[45] Date of Patent: Apr. 17, 1990

[54] FLUTED ROLL FOR A CORRUGATED BOARD MANUFACTURING MACHINE

[75] Inventor: Hervé Lacaux, Condat Sur Vienne, France

[73] Assignee: Papeteries et Cartonneries Lacaux Freres, Limoges, France

[21] Appl. No.: 261,974

[22] Filed: Oct. 24, 1988

[30] Foreign Application Priority Data

Oct. 23, 1987 [FR] France ............................ 87 14712

[51] Int. Cl.$^4$ .............................................. B31B 1/64
[52] U.S. Cl. ................................... 493/470; 493/463; 493/471; 493/418; 156/473
[58] Field of Search ............... 493/463, 470, 471, 418; 156/209, 210, 470-474

[56] References Cited

U.S. PATENT DOCUMENTS

| | | |
|---|---|---|
| 2,776,452 | 1/1957 | Chavannes . |
| 2,936,158 | 5/1960 | Ramundo . |
| 3,932,248 | 1/1976 | Keaton . |
| 3,947,206 | 3/1976 | DeLigt et al. . |
| 4,338,154 | 7/1982 | Berthelot et al. ................... 156/472 |

FOREIGN PATENT DOCUMENTS

| | | |
|---|---|---|
| 34906 | 9/1981 | European Pat. Off. . |
| 2154516 | 5/1973 | France . |
| B-2404709 | of 1977 | France . |
| 8-2348817 | 10/1978 | France . |

Primary Examiner—Judy Hartman
Assistant Examiner—Jack W. Lavinder
Attorney, Agent, or Firm—Wenderoth, Lind & Ponack

[57] ABSTRACT

A roll (16) for a corrugated board manufacturing machine (10) comprises a shell (32) defining an inner suction chamber (56) permanently connected to a source of low pressure. A series of radial suction apertures (60) open onto the peripheral surface (58) of the shell. According to the invention, the roll comprises a series of axial ducts (80) provided in the body of the shell (32) in which permanently circulates a heat-carrying fluid for heating the shell.

12 Claims, 5 Drawing Sheets

FLUTED ROLL FOR A CORRUGATED BOARD MANUFACTURING MACHINE

BACKGROUND OF THE INVENTION

The present invention relates to a roll for a corrugated board manufacturing machine.

A corrugated board manufacturing machine comprises at least two fluted rolls engaged one in the other and between which a sheet of paper is passed so as to form corrugations therein.

An important technical progress in the design of corrugated board manufacturing machines, commonly termed "corrugators", consisted in maintaining the sheet of paper subjected to the corrugation, no longer by segments outside the fluted corrugation rolls, but by means of a source of low pressure, which creates a phenomenon of causing the sheet of paper to be held closely against the cylinder by suction.

There has thus been proposed in the document FR-8-2348817 a corrugated board manufacturing machine whose fluted roll comprises a shell defining an inner suction chamber permanently connected to a source of low pressure and provided with a series of suction apertures opening onto the peripheral surface of the shell.

Although the solution proposed in the document is satisfactory as concerns the maintenance of the sheet of paper on the outer peripheral surface of the shell by suction, it nonetheless has several drawbacks. The lower corrugating roll, having a suction arrangement, is not equipped with heating ability enabling a correct thermo-forming of the corrugations of the sheet of paper to be effected. This absence of heating requires arranging the passage of superheated steam through a hollow inner portion of the upper corrugating roll, similar to the suction chamber of the lower corrugating roll. The phase of the heating of the sheet of paper therefore does not coincide with the phase for mechanically forming the corrugations. Moreover, this document proposes no simple and effective technical way of connecting the inner chamber of the lower corrugating roll to a source of low pressure, the sectional view of the lower corrugating roll shown in the document merely being a diagram for illustrating the principle of operation thereof.

Document FR-B-2 404 709 describes and illustrates a corrugating machine whose second corrugating roll, on the semi-circumference of which the sheet of paper is wound, comprises an inner heating chamber in which steam circulates. The system for maintaining the sheet of paper on the fluted roll by the effect of suction is constituted by an arrangement outside the roll comprising, in particular, an assembly of lateral, front and rear walls defining an outer suction chamber surrounding the other semi-circumference of the fluted roll, the suction means further comprising heating means for avoiding differences of expansion between the various component elements of the assembly. The solution proposed in this document is complex and costly, in particular in that it requires the use of many components independent of the roll which must be arranged with precision on the periphery of the latter.

The document FR-B-2 645 027 describes and illustrates a corrugating machine whose lower fluted roll comprises an inner heating chamber in which saturated steam circulates, this chamber being defined by a cylindrical shell whose outer peripheral surface is fluted, a large number of longitudinal ducts being drilled in the body of the shell so as to be evenly spaced apart throughout the width of the cylinder, i.e. throughout the effective fluted length of the latter, and which are connected to a source of low pressure. Each longitudinal duct is connected to the outer fluted peripheral surface of the shell through axial apertures which have a smaller diameter and are drilled evenly along each duct.

This arrangement, although it has the advantage of grouping within the fluted roll the paper sheet heating and suction functions, nonetheless has many drawbacks. The connection of each longitudinal duct with a source of low pressure, such as for example a vacuum pump, is achieved by means of a semi-circular shaped sector which bears on an end edge surface of the shell and in front of which pass in succession the longitudinal ducts spaced apart on a semi-circumference of the roll and which performs the function of a rotary depression distributor. This design requires the use of a very powerful source of low pressure having a high rate of flow, since the longitudinal ducts are alternately put back into communication with the ambient air, which fills them, and then put back in communication with the source of depression.

More basically, this design in which the suction ducts are disposed on the periphery of the roll and in which the heating source is a cylindrical chamber within the shell, does not permit ensuring an effective heating of the sheet of paper in contact with the roll. Indeed, the circulation of air in the longitudinal outer peripheral ducts tends to cool the fluted roll in opposition to the heating action of the circulation of steam in the inner chamber, this cooling also having a result of producing a phenomenon of a very great amount of condensation of water inside the inner heating chamber. The condensed water driven in rotation forms an "annular shell of water" which provides an insulation and causes a large temperature gradient between the steam and the outer shell, which is made from metal, having an adverse effect on the thermal conductivity efficiency of the assembly.

SUMMARY OF THE INVENTION

In order to overcome the aforementioned drawbacks, the present invention proposes a roll for a corrugated board manufacturing machine having a shell defining an inner suction chamber permanently connected to a source of low pressure and provided with a series of suction apertures opening onto the peripheral surface of the shell. A series of axial ducts are provided in the body of the shell, in which ducts permanently circulates a heat-carrying fluid for heating the shell.

According to other features of the invention, the roll has an even number of axial ducts, which are evenly spaced apart and connected in pairs so as to constitute heating circuits, each formed by at least two open-ended ducts whose ends, located adjacent to a first end of the shell, are interconnected, and whose opposite ends respectively form an inlet and an outlet for the heat-carrying fluid.

The roll also has a first end side wall closing the shell and defining connecting passages interconnecting ends of two ducts of a pair of ducts, and a second end side wall comprising supply and discharge pipes respectively connecting, in parallel, the inlets to a fluid inlet and the outlets to a fluid discharge.

Due to these features, it is possible to achieve an ideal heating of the corrugated sheet of paper by the heat-carrying fluid, such as saturated steam, or oil, preferably superheated and travelling through the series of ducts provided in the thickness of the shell of the roll at a small distance from the peripheral surface of the roll, on which the teeth are formed, and in a direction parallel to its axis, these ducts being interconnected by the two end lateral walls which are machined in consequence in such manner as to ensure that the inlet and outlet of the heat-carrying fluid occur at the same end of the cylinder.

According to other features the first side wall has an axial journal for mounting the roll in a corresponding bearing and is provided with an inner suction bore having one end opening onto the suction chamber and an opposite end, which may be for example a blind end, which is then connected to the source of low pressure through at least one radial aperture extending through the journal and through a sealed rotary joint device arranged around the region of the journal in which the radial aperture opens out.

The free end of the journal of the first side wall includes mechanism for driving the roll in rotation.

The second side wall has a journal for mounting the roll in a corresponding bearing and is provided with two concentric inner conduits each, respectively, connecting the supply pipes to the fluid inlet and the discharge pipes to the fluid outlet.

The supply pipes may be advantageously formed by a series of substantially radial passages connecting the fluid inlets to one of the two concentric conduits. The discharge pipes are constituted by a series of radial passages connecting the fluid outlets to the other of the two concentric conduits.

The invention also provides a corrugated board manufacturing machine which comprises at least one fluted roll according to the invention.

BRIEF DESCRIPTION OF THE DRAWINGS

Further features and advantages of the invention will be apparent from the following detailed description with reference to the accompanying drawings, in which:

FIG. 3 is a sectional view taken on line 3—3 of FIG. 2a;

DESCRIPTION OF THE PREFERRED EMBODIMENT

Figure 6:
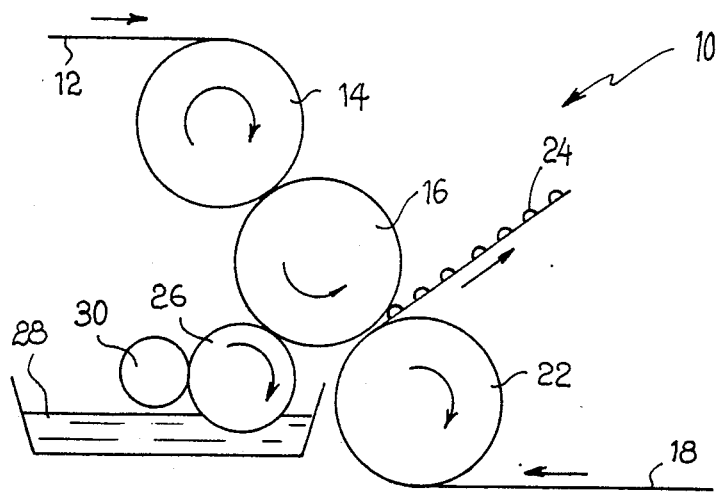
FIG. 6 is a diagram showing the operation of a corrugated board manufacturing machine comprising at least one fluted roll according to FIGS. 1 to 5.

Diagrammatically shown in FIG. 6 is a conventional single-face corrugating machine in which the corrugation paper 12 is corrugated by a passage between two fluted rolls 14 and 16 placed one above the other, then adhered to a liner paper sheet 18 between the lower fluted roll 16 and a smooth roll 22, so as to finally leave the machine in the form of a single-face corrugated board strip. The corrugation paper receives the adhesive from a roll 26 which is immersed in a tank 28 of adhesive. The thickness of the adhesive deposited on the sheet of paper is adjusted by the gap between the roll 26 and an auxiliary roll 30.

FIGS. 1 to 5 show a fluted roll, such as the lower fluted roll 16 of FIG. 6, constructed in accordance with the teaching of the invention.

The roll 16 is mainly formed by a cylindrical shell 32 to the ends of which are mounted a first closing side wall 34 and a second closing side wall 36. The closing side walls 34 and 36 are each axially extended by a journal 38, 40, respectively, for rotatively mounting the roll 16 in corresponding bearings 42 and 44.

The shell 32 defines an inner cylindrical bore 46 in which are fitted two confronting cylindrical extensions 48 and 50 of the side walls 34 and 36, respectively. The confronting planar radial surfaces 52 and 54 of the cylindrical extensions 48 and 50 define, with the surface of the bore 46, an inner suction chamber 56 of the fluted roll 16.

The inner suction chamber 56 is connected to a cylindrical peripheral surface 58 of the shell 32 through twelve series of radial suction apertures 60, these twelve series being spaced angularly apart around the axis X—X of the roll. Each series of apertures 60 comprises a plurality of radial apertures aligned along an axial generatrix, and each of which opens onto a corresponding annular recess 62 of the peripheral surface 58 which it connects to the inner suction chamber 56, either directly or through axial conduits 64 provided in the cylindrical extensions 48 and 50.

Figure 1:
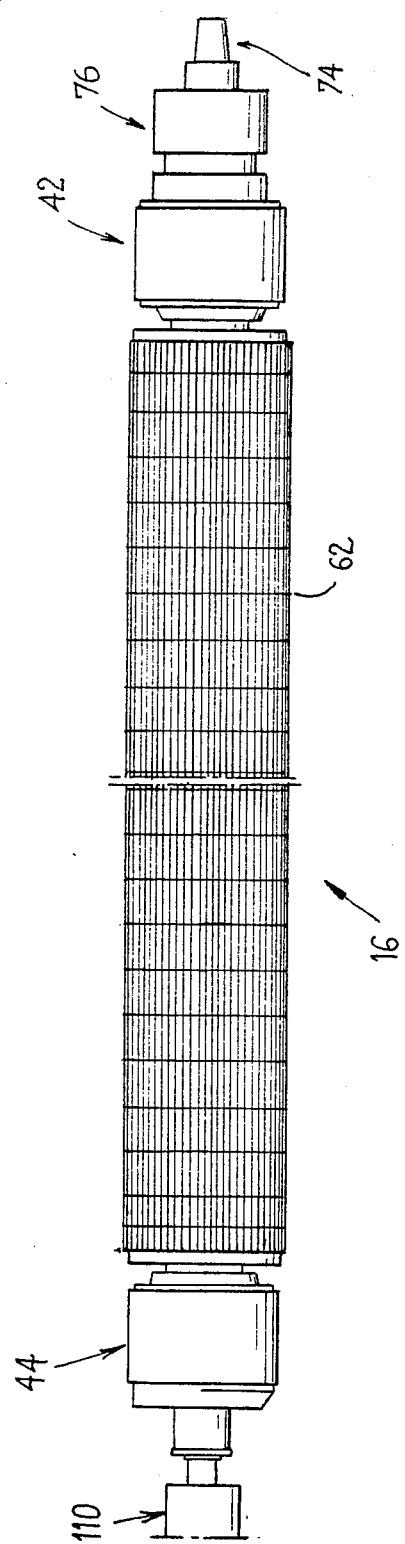
FIG. 1 is a simplified elevational view of a roll according to the invention.
Figure 2A:
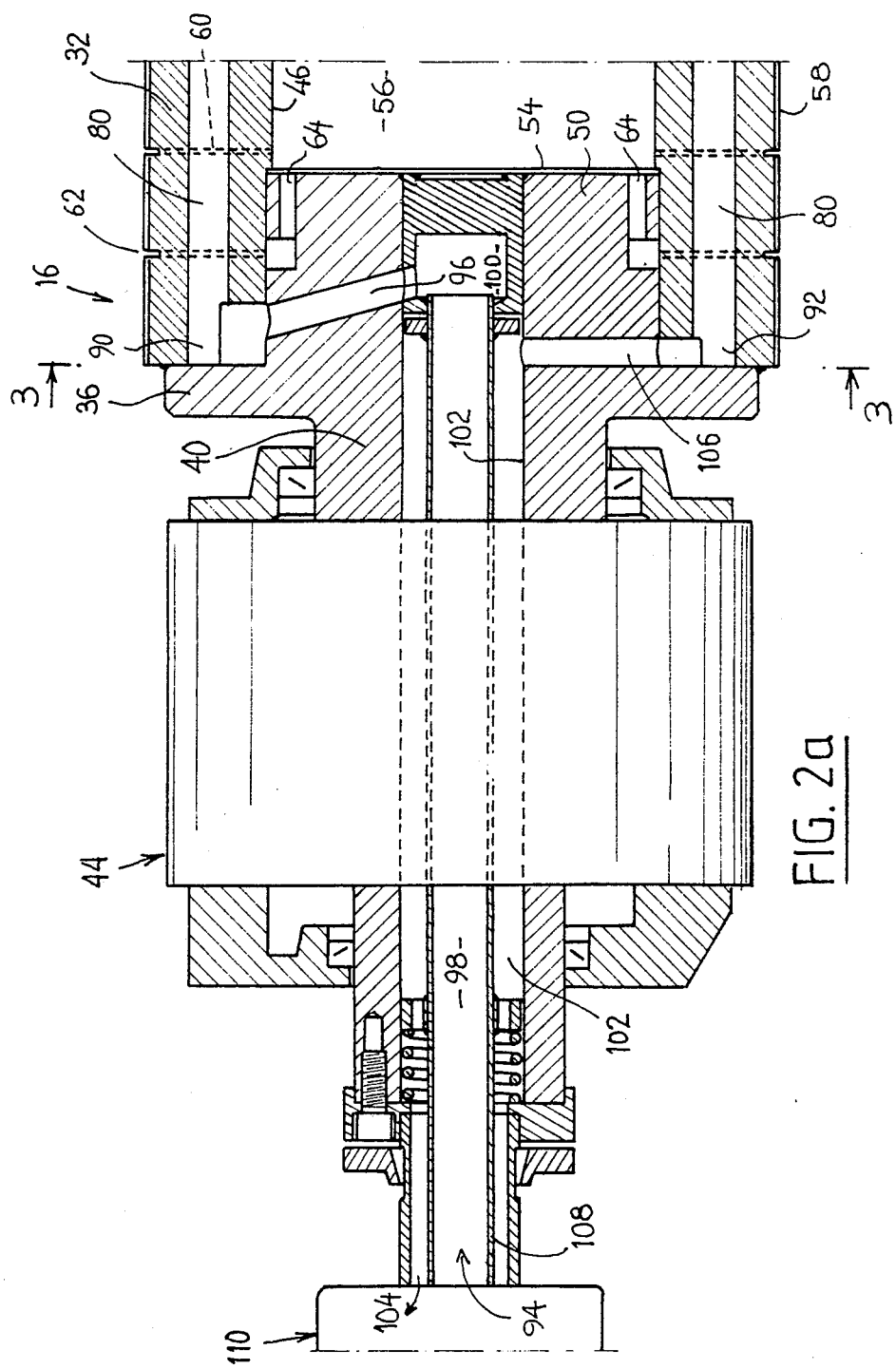
FIGS. 2a and 2b are axial sectional views, taken on line 2—2 of FIG. 3, of two end portions of the roll shown in FIG. 1.
Figure 2B:
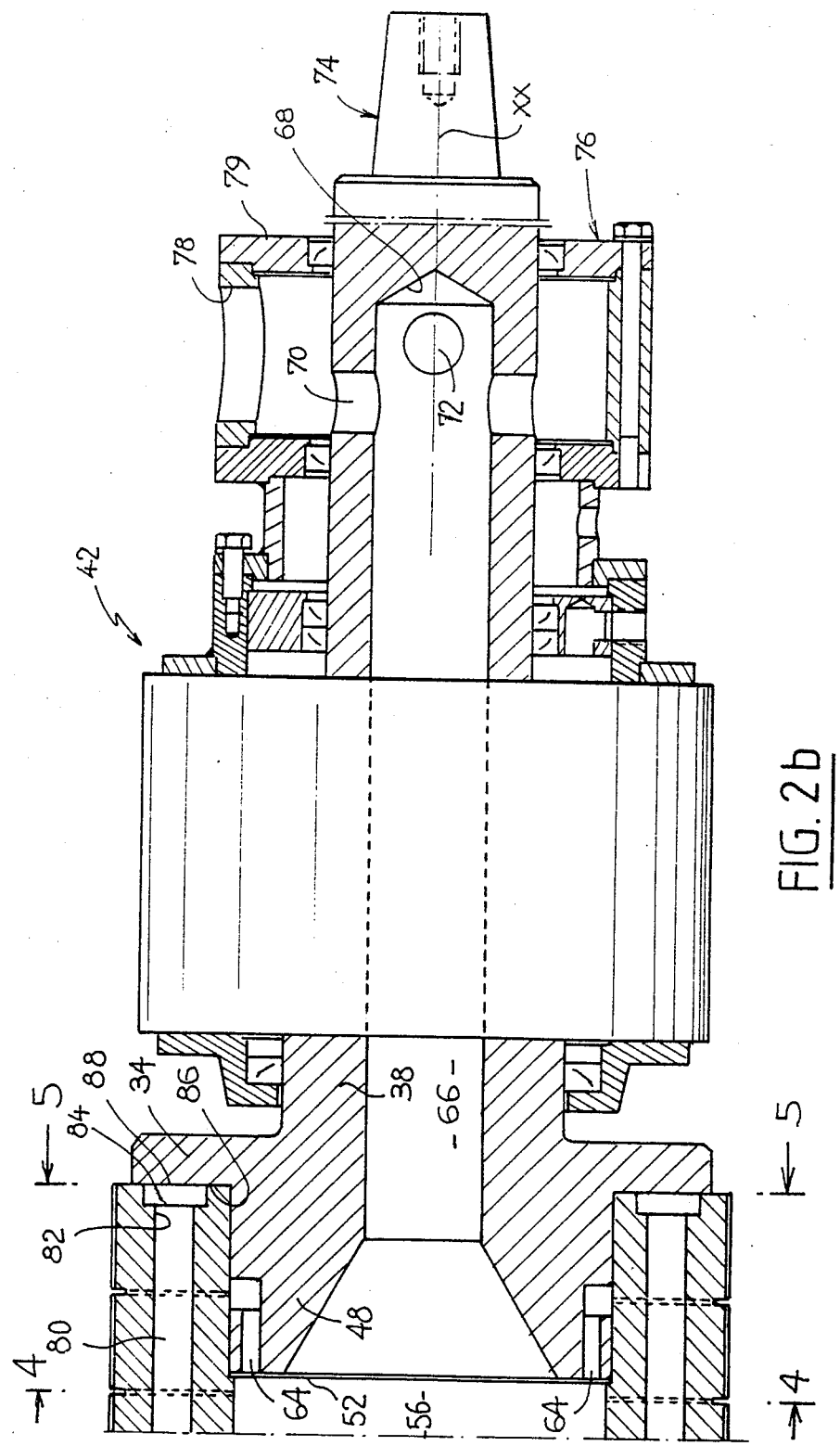
Figure 3:
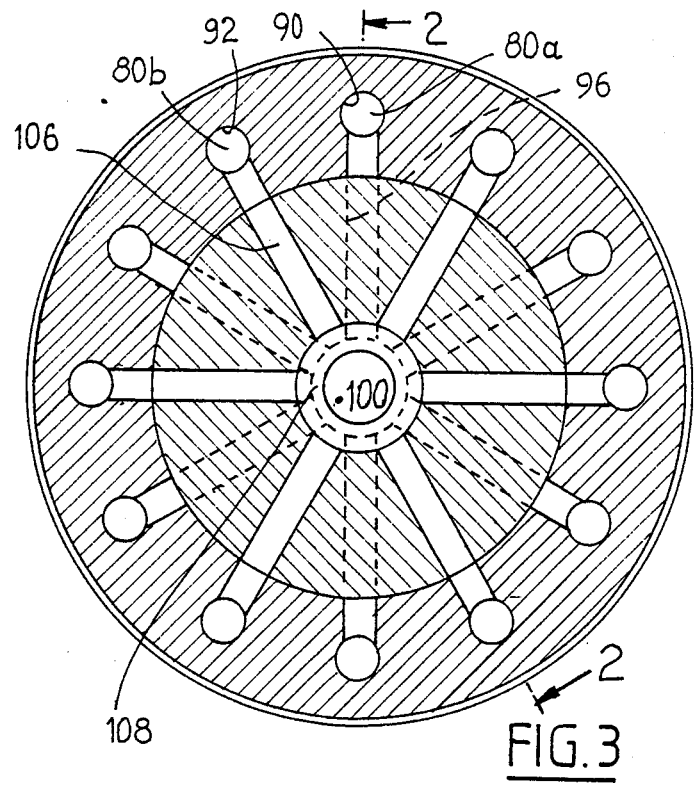
Figure 4:
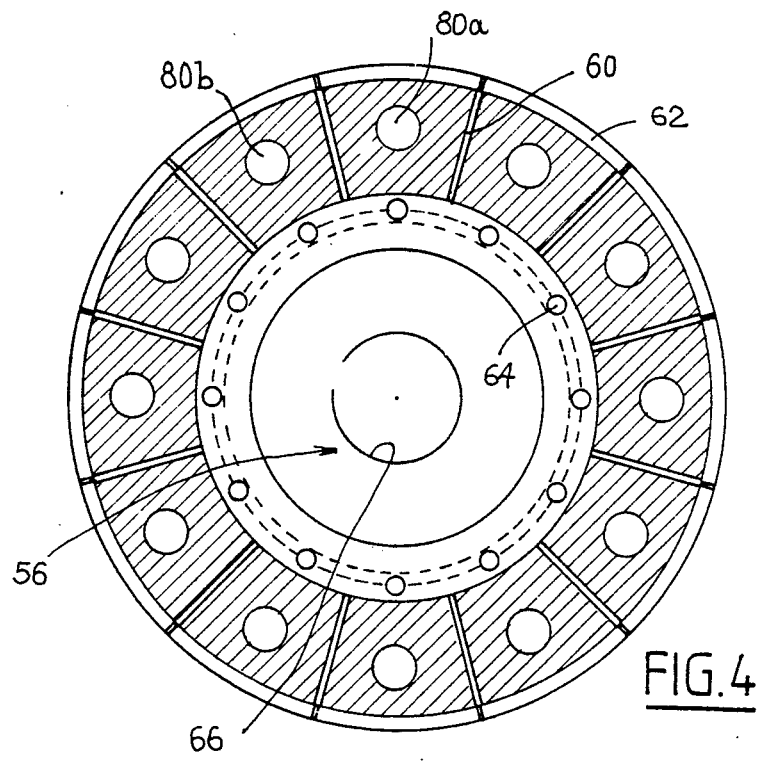
FIG. 4 is a sectional view taken on line 4—4 of FIG. 2b.
Figure 5:
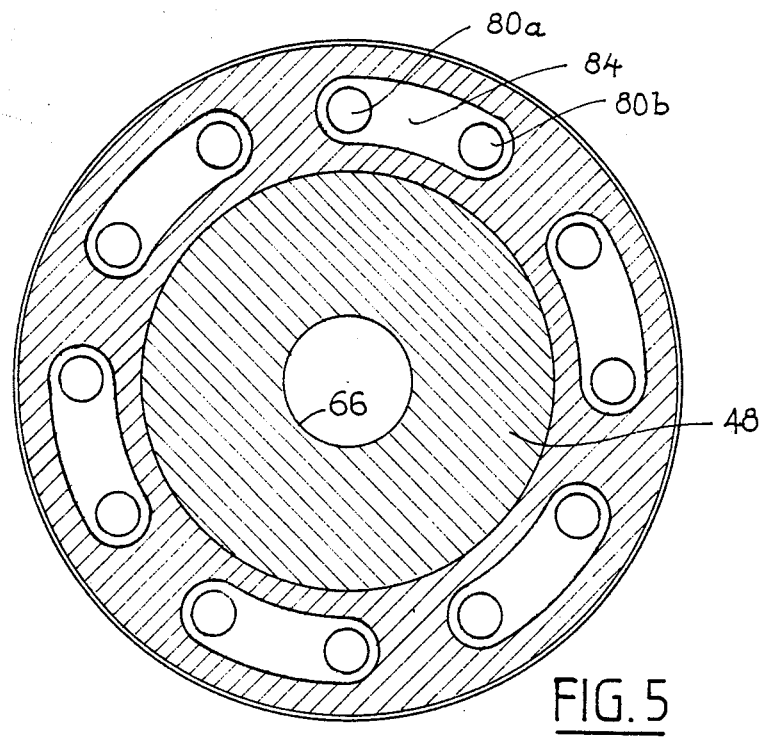
FIG. 5 is a sectional view taken on line 5—5 of FIG. 2b.

As can be seen in FIG. 2b, the side wall 34 and its stepped cylindrical journal 38 include an inner suction bore 66 having one end, namely the left end as viewed in FIG. 2b, which opens onto the inner suction chamber 56, and an opposite blind end 68 which is connected to a source of low pressure (not shown). For this purpose, two radial open-ended passages 70 and 72 are each provided in a region of the journal 38 close to its free end 74 and put the inner suction bore 66 in communication with a rotating sealed joint device 76 whose fixed housing 79 has an orifice 78 which is connected to the source of low pressure. As can be seen in FIG. 2b, the free end 74 of the journal 38 is arranged to receive a mechanism for driving the fluted roll 16 in rotation.

According to the invention, the shell 32 has a series of axial ducts 80 produced by drilling in the body of the shell 32 and in which permanently circulates a heat-carrying fluid for heating the shell 32, such as, for example, superheated steam.

The axial ducts 80 are provided in an even number and are angularly spaced apart around the axis X—X of the roll 16. In the embodiment illustrated in the Figures, twelve ducts 80 are provided and interconnected in pairs so as to constitute heating circuits each formed by two ducts 80a and 80b. The right lateral ends, as viewed in FIG. 2b, of two adjacent ducts 80a and 80b are interconnected by a connecting passage 84 formed by a sector of a circular groove formed in a radial end edge surface 86 of the shell 32 and laterally defined by a confronting annular radial surface 88 of the first closing side wall 34.

The left lateral end of the duct 80a constitutes a heat-carrying fluid inlet 90 while the left lateral end of the adjacent duct 80b constitutes an outlet 92 for this fluid.

The six fluid inlets 90 of the six ducts 80a are connected in parallel to a supply 94 of heat-carrying fluid by six supply pipes 96 which open onto a first inner conduit 98 of the journal 40 of the second side wall 36 defined by a tube 108 mounted coaxially in the journal.

Each supply pipe 96 is formed by a substantially radial drilling extending through the cylindrical extension 50 from an inlet 90 and opens onto a fluid supply chamber 100 which is connected to the supply 94 through the inner supply conduit 98.

A second annular concentric conduit 102 surrounding the inner supply conduit 98 is arranged in the journal 40 and connects the outlets 92 of the axial ducts 80b to a discharge 104 of the heat-carrying fluid. This connection is ensured by discharge pipes 106 each constituted by a radial drilling extending from the outlet 92 to the outer concentric discharge bore of the discharge conduit 102 of the journal 40.

The heat-carrying fluid supply conduit 94 and the discharge conduit 104 are connected to a source of heat (not shown) by means of a conventional rotating sealed joint device 110.

The structure of the fluted roll 16 according to the invention just described permits a very highly effective heating of the roll which overcomes the drawbacks of known systems, in particular in avoiding an excessive condensation of the saturated steam owing to the proximity of the steam ducts with the fluted surface and the very high speed of the flow of the steam throughout the length of these ducts.

In a corrugated board manufacturing machine, it is possible to arrange a series connection of the supplies of heat-carrying fluid of the rolls, i.e. to arrange that the steam leaving the main roll 16 according to the invention is re-injected into the other fluted and smooth rolls, for example through an outer enclosure forming a condensation chamber. Likewise, the steam and condensed water outlet of the last-mentioned rolls may be advantageously connected to the supply of a roll for pre-heating the corrugation paper or the lining paper, so as to obtain, owing to the very high rate of flow employed, the highest possible rate of circulation of the steam throughout the conduits and passages formed in the thickness of the roll 16 of the invention.

The design according to the invention also permits reducing the temperature drop currently observed at the two ends of the effective part of the fluted rolls, which is due to the necessarily large extent of the fitting of the journals of the roll, by means of the open-ended heating ducts 80.

For a given heating temperature, the design of the cylinder according to the invention permits achieving a very large economy as concerns the production of steam.

The machine shown in FIG. 6 must be completed by covering plates of the type described and shown in the document FR-B 2 348 817 which come to abut in a sealed manner in the annular recesses 62 in the region of the latter which is not covered by the sheet.

As a modification, the axial ducts forming a heating circuit may be each constituted by an even number of ducts 80 exceeding 2.

I claim:

1. A roll for a machine for manufacturing corrugated board, said roll comprising:
   a hollow roll shell comprising a roll body, said shell having a peripheral surface and an internal cylindrical suction chamber for permanent connection to a source of low pressure;
   a series of radial suction apertures in said shell opening onto said peripheral surface of said shell and connecting said peripheral surface of said shell with said suction chamber; and
   a series of axial ducts in a peripheral portion of said body of said shell for permanently circulating a heat carrying fluid for heating said shell;
   wherein said series of axial ducts comprises an even number of said axial ducts evenly spaced apart and connected in pairs, each said pair constituting a heating circuit, and each said axial duct having opposite open ends;
   the ends of each said pair of axial ducts at a first end of said shell are interconnected; and
   the opposite ends of each said pair of axial ducts at a second end of said shell are an inlet and an outlet, respectively, for the heat carrying fluid.

2. The roll as set forth in claim 1, wherein:
said internal cylindrical suction chamber lies along the central longitudinal axis of said hollow roll shell.

3. The roll as set forth in claim 1, wherein:
said hollow roll shell has one and only one said internal cylindrical suction chamber.

4. The roll as set forth in claim 1, and further comprising:
two end sidewalls closing, respectively, said first and second ends of said shell, a first said sidewall defining connecting passages for interconnecting said ends of each said pair of axial ducts at said first end of said shell, and a second said sidewall having a plurality of supply channels and discharge channels therein for respectively connecting in parallel said inlets to a heat carrying fluid supply and said outlets to a heat carrying fluid discharge.

5. The roll as set forth in claim 4, wherein:
each said pair of axial ducts comprises two adjacent ducts; and
each said connecting passage comprises a circular sector groove on an annular radial edge surface of said shell and a confronting annular radial surface on said first sidewall.

6. The roll as set forth in claim 4, wherein:
said first sidewall further comprises an axial journal for mounting said roll in a bearing and an inner suction bore, said inner suction bore having one end communicating with said internal cylindrical suction chamber and an opposite end for connection to the source of low pressure.

7. The roll as set forth in claim 6, wherein:
said opposite end of said suction bore is a blind end having at least one radial aperture extending through said axial journal for connection to the source of low pressure; and
a relatively rotatable sealed joint surrounds said axial journal at said at least one radial aperture.

8. The roll as set forth in claim 6, wherein:
a free end of said axial journal of said first sidewall comprises means for driving said roll in rotation.

9. The roll as set forth in claim 4, wherein:
said second sidewall further comprises a journal for mounting said roll in a bearing and two concentric inner conduits, a first said inner conduit connecting said supply channels to the heat carrying fluid supply and the second said inner conduit connecting said discharge channels to the heat carrying fluid discharge.

10. The roll as set forth in claim 9, wherein:

said supply channels comprises a series of substantially radial passages connecting said inlets of said pairs of axial ducts to said first inner conduit, and said discharge channels comprise a series of radial passages connecting said outlets of said pairs of axial ducts to said second inner conduit.

11. The machine as claimed in claim 10, wherein:
said series of axial ducts surrounds said internal cylindrical suction chamber.

12. A machine for manufacturing corrugated board comprising means for corrugating a corrugation paper, means for applying an adhesive to said corrugation paper, and means for adhering said corrugation paper to a liner paper sheet, said means for corrugating a corrugation paper having at least one roll comprising:

a hollow roll shell comprising a roll body, said shell having a peripheral surface and an internal cylindrical suction chamber for permanent connection to a source of low pressure;

a series of radial suction apertures in said shell opening onto said peripheral surface of said shell and connecting said peripheral surface of said shell with said suction chamber; and a series of axial ducts in a peripheral portion of said body of said shell for permanently circulating a heat carrying fluid for heating said shell;

wherein said series of axial ducts comprises an even number of said axial ducts evenly spaced apart and connected in pairs, each said pair constituting a heating circuit, and each said axial duct having opposite open ends;

the ends of each said pair of axial ducts at a first end of said shell are interconnected; and the opposite ends of each said pair of axial ducts at a second end of said shell are an inlet and an outlet, respectively, for the heat carrying fluid.

* * * * *